United States Patent
Tseng

(10) Patent No.: US 8,184,577 B2
(45) Date of Patent: May 22, 2012

(54) METHOD AND APPARATUS FOR CONFIGURING A TRANSPORT BLOCK SIZE IN A WIRELESS COMMUNICATIONS SYSTEM

(75) Inventor: Li-Chih Tseng, Taipei (TW)

(73) Assignee: Innovative Sonic Limited, Port Louis (MU)

(*) Notice: Subject to any disclaimer, the term of this patent is extended or adjusted under 35 U.S.C. 154(b) by 1025 days.

(21) Appl. No.: 12/048,235

(22) Filed: Mar. 14, 2008

(65) Prior Publication Data

US 2008/0225784 A1    Sep. 18, 2008

Related U.S. Application Data

(60) Provisional application No. 60/894,695, filed on Mar. 14, 2007.

(51) Int. Cl.
H04L 12/26 (2006.01)
H04B 7/00 (2006.01)
H04B 7/208 (2006.01)
H04W 72/00 (2009.01)
H04W 4/00 (2009.01)

(52) U.S. Cl. ........ 370/329; 370/252; 370/310; 370/328; 370/229; 370/344; 455/450; 455/434; 455/522; 455/517; 455/511

(58) Field of Classification Search .................. 370/252, 370/310, 328, 329, 344, 229; 455/450, 434, 455/522, 517, 511
See application file for complete search history.

(56) References Cited

U.S. PATENT DOCUMENTS

2003/0147371 A1* 8/2003 Choi et al. .................... 370/341
(Continued)

FOREIGN PATENT DOCUMENTS

CN    1477886 A    2/2004
(Continued)

OTHER PUBLICATIONS

3GPP Universal Mobile Telecommunications System(UMTS); Multiplexing and channel coding (FDD)(3GPP TS 25.212 version 7.4.0 Release 7), Mar. 2007, cover page plus p. 1-101, XP014037877, ETSI,Sophia Antipolis Cedex—France.

(Continued)

Primary Examiner — Joe Cheng
Assistant Examiner — Nicholas Jensen
(74) Attorney, Agent, or Firm — Klein, O'Neill & Singh, LLP

(57) ABSTRACT

A method of setting a transport block size for a user equipment in a wireless communications system includes providing a combination table for being looked up to generate a parameter value according to a combination of a modulation scheme and a number of channelization codes indicated by a base station, so as to decide a transport block size index, and configuring a first parameter value corresponding to a least resource usage in the combination table as a first transport block size index before deciding the transport block size index. The first transport block size index is a transport block size index corresponding to a smallest transport block size in a transport block size table, and the combination table and the transport block size table are used when quadrature phase shift keying (QPSK) modulation, 16 quadrature amplitude modulation (16QAM) or 64 quadrature amplitude modulation (64QAM) is activated.

8 Claims, 3 Drawing Sheets

U.S. PATENT DOCUMENTS

| | | | |
|---|---|---|---|
| 2004/0081181 A1* | 4/2004 | Malkamaki | 370/410 |
| 2006/0067229 A1* | 3/2006 | Frederiksen | 370/235 |
| 2007/0025300 A1 | 2/2007 | Terry | |
| 2007/0036108 A1 | 2/2007 | Benoist | |
| 2007/0183359 A1 | 8/2007 | Chen et al. | |
| 2007/0195809 A1* | 8/2007 | Blanz et al. | 370/426 |
| 2007/0253388 A1 | 11/2007 | Pietraski | |
| 2007/0297360 A1 | 12/2007 | Joachim et al. | |
| 2009/0106619 A1 | 4/2009 | Onggosanusi | |
| 2010/0067459 A1 | 3/2010 | Goransson | |
| 2010/0208635 A1* | 8/2010 | Frederiksen et al. | 370/310 |

FOREIGN PATENT DOCUMENTS

| | | | |
|---|---|---|---|
| CN | 1535041 A | | 10/2004 |
| EP | 1 708 524 A1 | | 10/2006 |
| JP | 2004536505 A | | 12/2004 |
| JP | 2006115358 A | * | 4/2006 |
| JP | 2006246457 A | | 9/2006 |
| JP | 2006345501 A | | 12/2006 |
| JP | 200822561 A | | 1/2008 |
| JP | WO 2008050453 A1 | | 5/2008 |
| JP | 2008541596 A | | 11/2008 |
| KR | 20030067412 A | | 8/2003 |
| KR | 1020030067412 | * | 8/2003 |
| KR | 20030079631 | | 10/2003 |
| KR | 1020060121868 A | | 11/2006 |
| KR | 100663278 | | 1/2007 |
| KR | 1020070055004 | | 5/2007 |
| KR | 1020080084059 A | | 9/2008 |
| TW | 200635299 A | | 10/2006 |
| WO | 03001681 | | 1/2003 |
| WO | 2006126079 A2 | | 11/2006 |
| WO | 2008050453 A1 | | 5/2008 |

OTHER PUBLICATIONS

Philips, HARQ process handling for Rel-7 FDD MIMO, Jan. 15-19, 2007, 3GPP TSG RAN WG2 Meeting #56 bis, Tdoc R2-070289,XP050133378, Sorrento,Italy.

Ericsson, "Signaling of Transport Block Sizes for HS-DSCH", 9.2.2 ,Jun. 24-27, 2002, p. 1-13, TSG-RAN WG2 #30,Tdoc R2-0221668,XP 050096610,Turin, Italy.

Samsung,"Mapping between transport block size and 6-bit index value", Feb. 18-22, 2002,p. 1-4, 3GPP TSG-RAN WG2 meeting#27,Tdoc R2-020384,XP050119993,Orlando, U.S.A.

R1-071183 3GPP TSG-RAN WG1 Meeting #48, "Introduction of 16QAM for HSUPA", Feb. 2007.

R2-071085 3GPP TSG-RAN WG2 Meeting #57, "Introduction of 16QAM in 25.321", Feb. 2007.

R2-071089 3GPP TSG-RAN WG2 Meeting #57, "Introduction of 64QAM in MAC specification", Feb. 2007.

3GPP TS 25.321 V7.3.0 (Dec. 2006), "Medium Access Control (MAC) protocol specification (Release 7)".

Ericsson, HS-SCCH part 2 for UTRA MIMO, 3GPP TSG-RAN WG1 #48, R1-071081, St Louis, MO, USA, Feb. 12-16, 2007.

Office Action on corresponding foreign application (CN 200810085348.X) from the State Intellectual Property Office of the PRC dated Apr. 13, 2011.

Non-Final Office Action on related patent application (U.S. Appl. No. 12/048,233) from USPTO dated Mar. 7, 2011.

Office Action on corresponding foreign application (TW 97109017) from TIPO dated Jun. 20, 2011.

Office Action on corresponding foreign application (TW 97109016) from TIPO dated Jul. 28, 2011.

* cited by examiner

METHOD AND APPARATUS FOR CONFIGURING A TRANSPORT BLOCK SIZE IN A WIRELESS COMMUNICATIONS SYSTEM

CROSS REFERENCE TO RELATED APPLICATIONS

This application claims the benefit of U.S. Provisional Application No. 60/894,695, filed on Mar. 14, 2007 and entitled "Method and Apparatus for improving the performance of high order modulation and MIMO in HSPA", the contents of which are incorporated herein by reference.

BACKGROUND OF THE INVENTION

1. Field of the Invention

The present invention relates to a method and apparatus for configuring a transport block size for a user equipment in a wireless communications system, and more particularly to a method and apparatus for configuring a transport block size for a user equipment in a high speed downlink packet access (HSDPA) system with 64 quadrature amplitude modulation (64QAM) or higher order modulation capability.

2. Description of the Prior Art

The third generation (3G) mobile telecommunications system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS requirements simultaneously, providing diverse, flexible, two-way transmission services and better communication quality to reduce transmission interruption rates. Through the 3G mobile telecommunications system, a user can utilize a wireless communications device, such as a mobile phone, to realize real-time video communications, conference calls, real-time games, online music broadcasts, and email sending/receiving. However, these functions rely on fast, instantaneous transmission. Thus, targeting at the third generation mobile telecommunication technology, the prior art provides High Speed Package Access (HSPA) technology, which includes High Speed Downlink Package Access (HSDPA) and High Speed Uplink Package Access (HSUPA), to increase bandwidth utility rate and package data processing efficiency to improve uplink/downlink transmission rate.

For a user equipment (UE) in HSDPA, physical channels include a high speed physical downlink shared channel (HS-PDSCH) for transferring payload data, and a high speed physical control channel (HS-DPCCH) for uploading an acknowledgement/negative acknowledgement (ACK/NACK) and a channel quality identifier (CQI). As for the media access control (MAC) layer of the HSDPA UE, a MAC-(e)hs entity utilizes a transport channel of a High Speed Downlink Shared Channel (HS-DSCH) for receiving data from the physical layer. In addition, a shared control channel for HS-DSCH (HS-SCCH) is used as a physical downlink channel, responsible for transmission of control signals corresponding to HS-DSCH, such as UE identities, channelization code sets, modulation schemes and transport block sizes, so that the UE can correctly receive data packets from HS-DSCH.

In HSDPA, two parameters are used to determine transport block (TB) sizes. One parameter is a Transport Format and Resource Indicator (TFRI) value carried in the second and the third slots of HS-SCCH, which is represented by $k_i$ and ranges from 0 to 63. The other is a $k_{o,i}$ value corresponding to a combination of a modulation scheme and a number of channelization codes chosen by the Node B, which can be determined by reading information of channelization code sets and modulation schemes carried in the first slot of HS-SCCH. Thus, a combination table is provided for the UE to map a combination of the chosen modulation scheme and the number of channelization codes to the $k_{o,i}$ value. A sum of the TFRI and the $k_{o,i}$ forms another index $k_t$ for determining actual TB sizes through the mapping of a transport block size table.

Please note that, the 3rd Generation Partnership Project (3GPP) newly introduces a combination table and a transport block size table in the aforementioned MAC protocol specification to support a high speed downlink packet access (HSDPA) system with 64 quadrature amplitude modulation (64QAM) capability, in which the range of TB sizes is enlarged for significantly enhancing data transmission rate.

However, since the $k_{o,i}$ value corresponding to a least resource usage in the combination table is larger than the index $k_t$ corresponding to a smallest TB size in the transport block size table, the smallest TB size cannot be used for data reception in the HSDPA system, so that waste of radio resources may occur. More specifically, since the least resource usage $k_{o,i}$ value (i.e. the minimum $k_{o,i}$ value) in the combination table is 20, which corresponds to a combination of Quadrature Phase Shift Keying (QPSK) modulation and one channelization code usage, the minimum index $k_t$ capable of being formed by $k_i$ and $k_{o,i}$ is also 20 (i.e. $k_t = k_{o,i} + k_i = 20 + 0 = 20$), so that smaller TB sizes corresponding to index $k_t$ from 0 to 19 in the transport block size table cannot be used for data reception in the HSDPA system. In this case, the waste of radio resources may occur in some situations. For example, if the network side only has 130 bits of data for transmission, since the smallest TB size capable of being used is the size of 272 bits corresponding to 20 of the index $k_t$, the length of padding bits in the being-transmitted TB will be up to 142 bits, which is even more than the transmitted data, resulting in the waste of radio resources.

In short, since the prior art cannot use smaller TB sizes for data reception, the waste of radio resources may occur.

SUMMARY OF THE INVENTION

According to the present invention, a method of configuring a transport block size for a user equipment in a wireless communications system is disclosed. The method comprises steps of providing a combination table for generating a parameter value according to a combination of a modulation scheme and a number of channelization codes chosen by a base station to decide a transport block size index, and configuring a first parameter value corresponding to a least resource usage in the combination table to be a first transport block size index before deciding the transport block size index, wherein the first transport block size index is a transport block size index corresponding to a smallest transport block size in a transport block size table, and the combination table and the transport block size table are used when Quadrature Phase Shift Keying (QPSK) modulation, 16 Quadrature Amplitude Modulation (16QAM) or 64 Quadrature Amplitude Modulation (64QAM) is activated.

According to the present invention, a communications device of a wireless communications system utilized for configuring a transport block size is further disclosed. The communications device comprises a control circuit for realizing functions of the communications device, a central processing unit installed in the control circuit for executing a program code to operate the control circuit, and a memory coupled to the central processing unit comprising the program code. The program code comprises providing a combination table for generating a parameter value according to a combination of a modulation scheme and a number of channelization codes chosen by a base station to decide a transport block size index, and configuring a first parameter value corresponding to a least resource usage in the combination table to be a first transport block size index before deciding the transport block size index, wherein the first transport block size index is a transport block size index corresponding to a smallest transport block size in a transport block size table, and the combination table and the transport block size table are used when Quadrature Phase Shift Keying (QPSK) modulation, 16 Quadrature Amplitude Modulation (16QAM) or 64 Quadrature Amplitude Modulation (64QAM) is activated.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
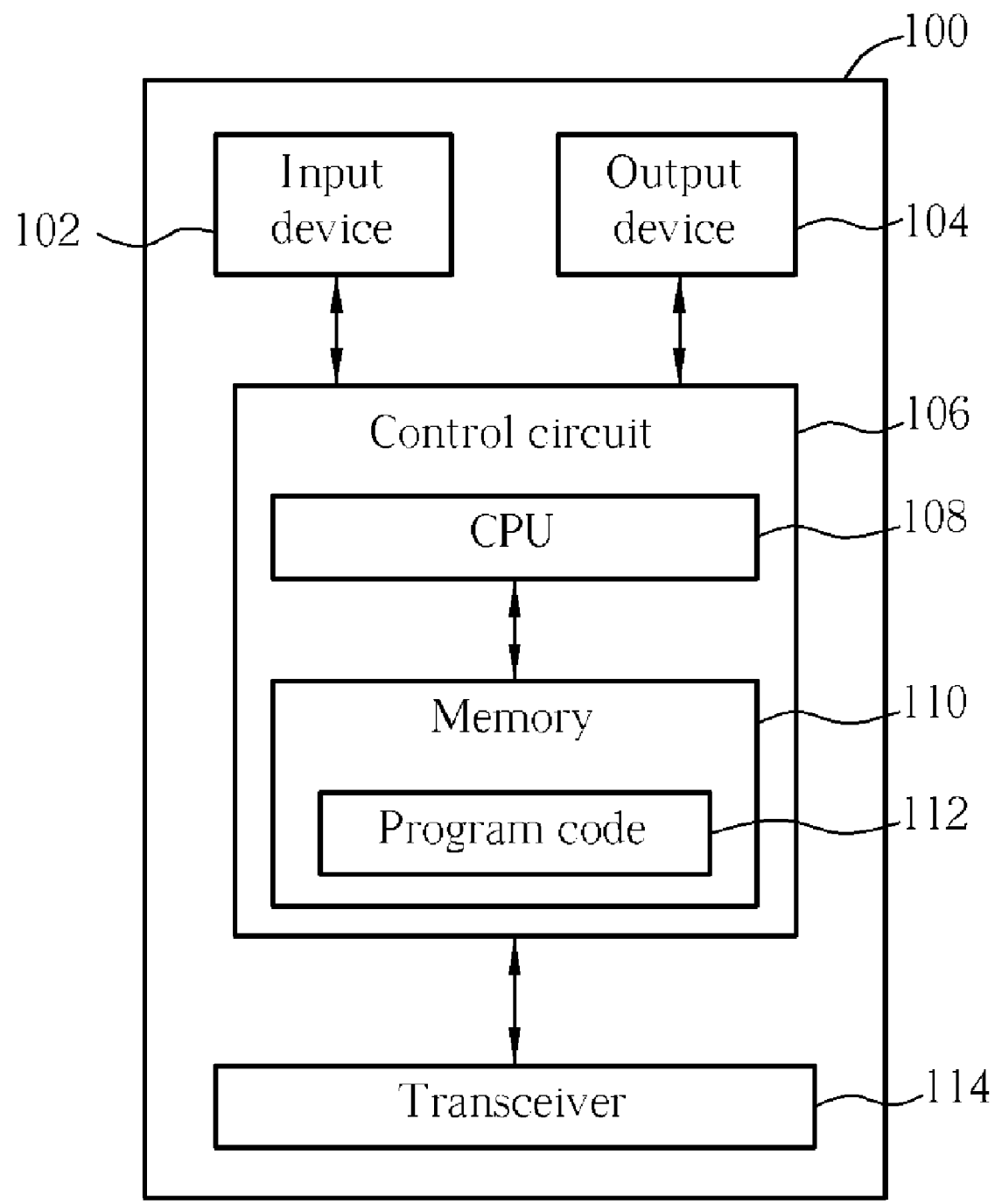
FIG. 1 is a function block diagram of a wireless communications device.

Please refer to FIG. 1, which is a function block diagram of a communications device 100. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3. Preferably, the communications device 100 is utilized in a third generation (3G) mobile communications system.

Figure 2:
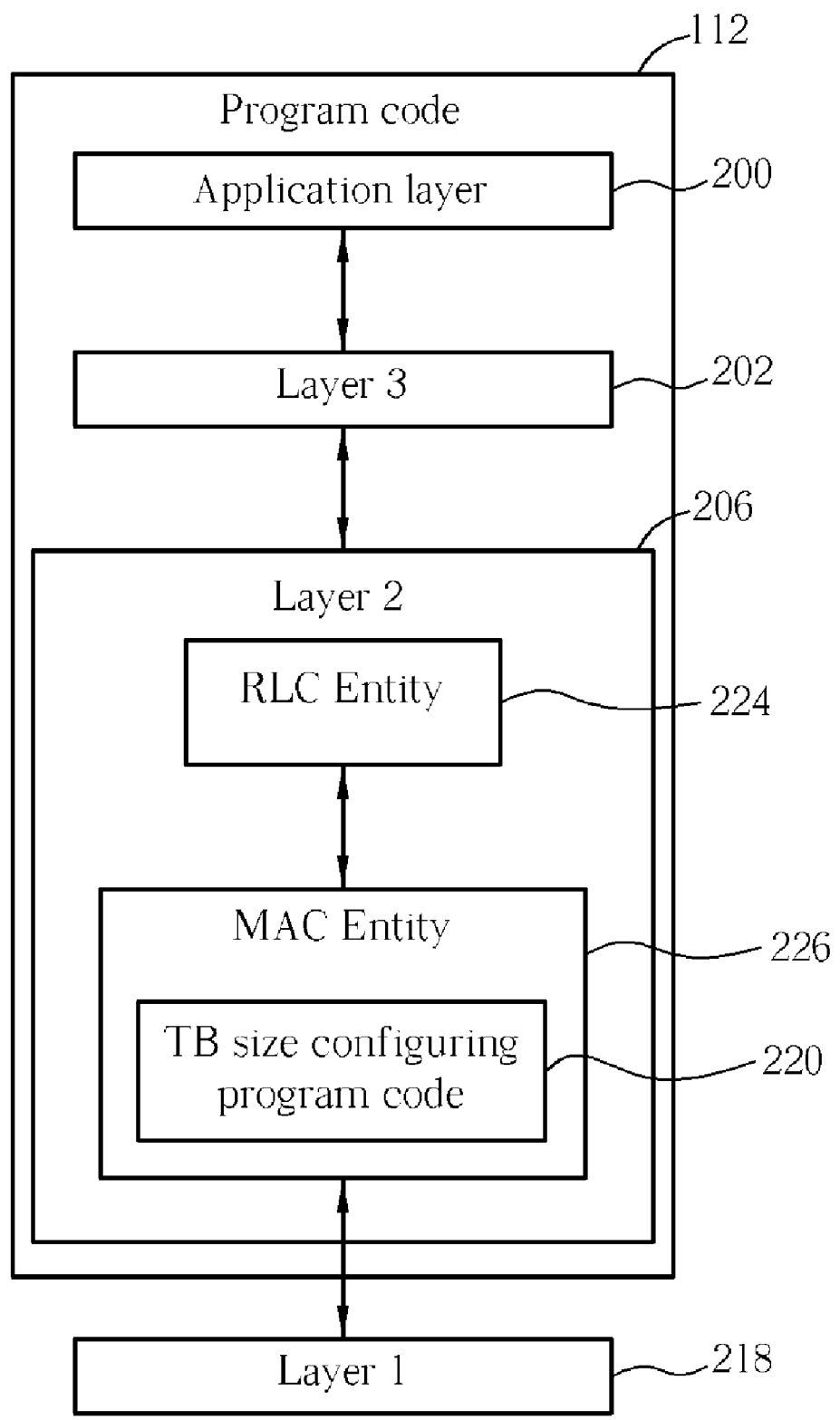
FIG. 2 is a diagram of program code of FIG. 1.

Please continue to refer to FIG. 2. FIG. 2 is a diagram of the program code 112 shown in FIG. 1. The program code 112 includes an application layer 200, a Layer 3 202, and a Layer 2 206, and is coupled to a Layer 1 218. The Layer 2 206 comprises two sub-layers: a radio link control (RLC) entity 224 and a media access control (MAC) entity 226. A primary function of the RLC entity 224 is providing segmentation, reassembly, concatenation, padding, retransmission, sequence check, and duplication detection on transmitted data or control instructions based on different transmission quality requirements. The MAC entity 226 can match packets received from different logic channels of the RLC entity 224 to common, shared, or dedicated transport channels according to radio resource allocation commands of the Layer 3 (RRC layer) 202, for performing channel mapping, multiplexing, transport format selection, or random access control.

Figure 3:
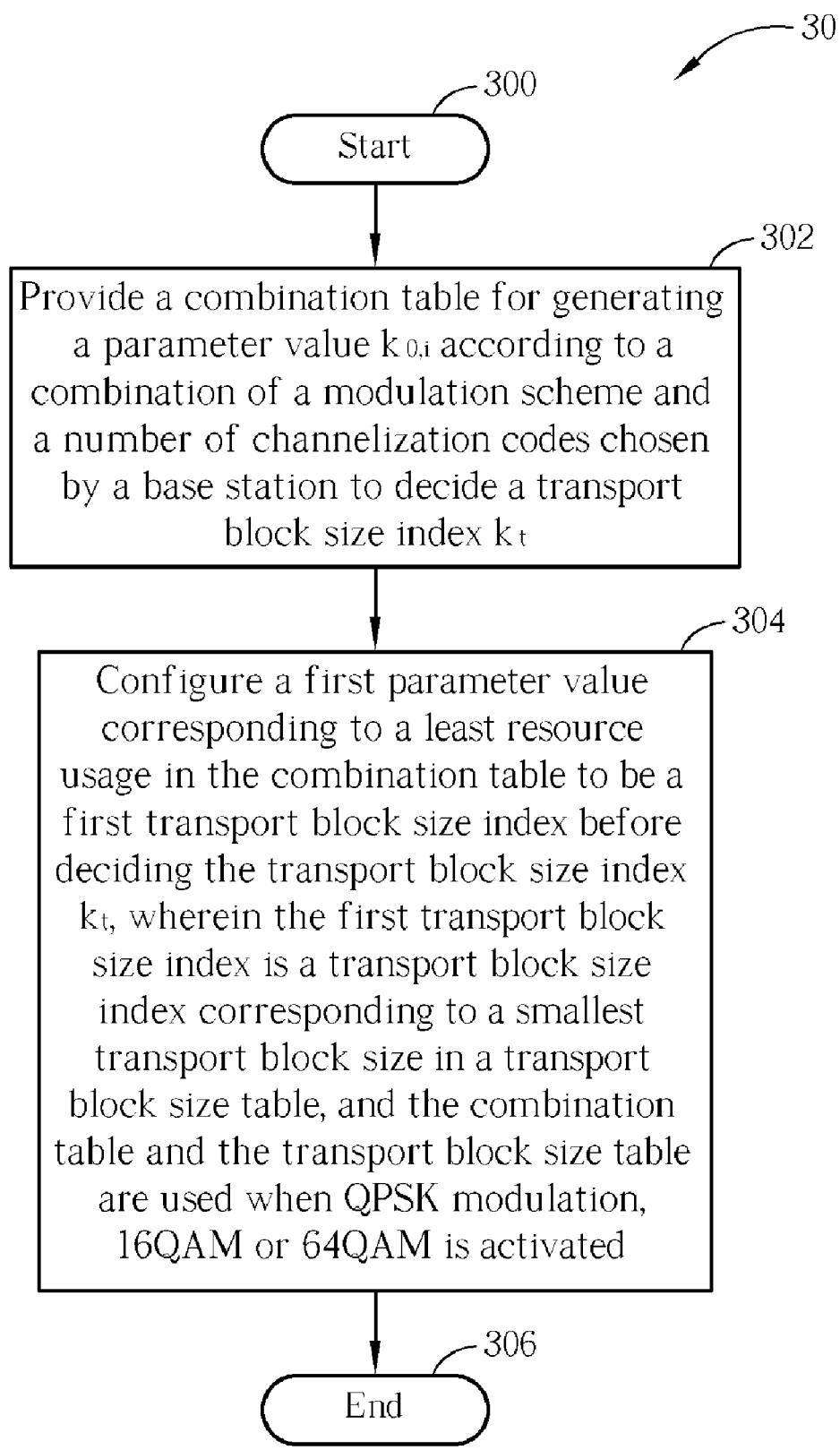
FIG. 3 is a flowchart of a process according to an embodiment of the present invention.

In realizing functions of high-speed downlink packet access (HSDPA), the MAC entity 226 can determine transport block (TB) sizes of TBs being received, so as to receive packet data from a High Speed Downlink Shared Channel (HS-DSCH) correctly according to control signals of a Shared Control Channel for HS-DSCH (HS-SCCH). In this situation, the embodiment of the present invention provides a TB size configuring program code 220 utilized for correctly deciding TB sizes, in order to prevent the waste of radio resources. Please refer to FIG. 3, which illustrates a flowchart diagram of a process 30 according to an embodiment of the present invention. The process 30 may be utilized in a user equipment (UE) of a wireless communications system for configuring a TB size, and can be compiled into the TB size configuring program code 220. The process 30 comprises the following steps:

Step 300: Start.

Step 302: Provide a combination table for generating a parameter value $k_{0,i}$ according to a combination of a modulation scheme and a number of channelization codes chosen by a base station to decide a transport block size index $k_t$.

Step 304: Configure a first parameter value corresponding to a least resource usage in the combination table to be a first transport block size index before deciding the transport block size index $k_t$, wherein the first transport block size index is a transport block size index corresponding to a smallest transport block size in a transport block size table, and the combination table and the transport block size table are used when Quadrature Phase Shift Keying (QPSK) modulation, 16 Quadrature Amplitude Modulation (16QAM) or 64 Quadrature Amplitude Modulation (64QAM) is activated.

Step 306: End.

According to the process 30, before deciding the transport block size index $k_t$, the embodiment of the present invention configures a first parameter value corresponding to a least resource usage in the combination table to be a first transport block size index. The first transport block size index is a transport block size index corresponding to a smallest transport block size in a transport block size table, and the combination table and the transport block size table are used when QPSK modulation, 16QAM or 64QAM is activated. Therefore, when only a few bits of data are needed for transmission on the network side, smaller TB sizes can then be used by the communications device 100 for performing data reception, so as to prevent the waste of radio resources.

Preferably, the transport block size index $k_t$ is a sum of the parameter value $k_{0,i}$ and a transport format and resource indicator (TFRI) value $k_i$, and the combination table and the transport block size table are stored in the communications device 100 to support an HSDPA system with 64 quadrature amplitude modulation (64QAM) or higher order modulation capability, and can be configured by upper layers.

Therefore, in the embodiment of the present invention, the parameter value $k_{0,i}$ corresponding to a least resource usage in the combination table (such as a parameter value corresponding to a combination of QPSK modulation and one channelization code usage) is configured to be an index value corresponding to the smallest TB size in the transport block size table, for improving the problem of the prior art of smaller TB sizes not being available for use to perform data reception or transmission, so as to prevent the waste of radio resources. In this case, the communications device 100 can correctly generate the parameter value $k_{0,i}$ according to a combination of the modulation scheme and the number of channelization codes chosen by the network, and can further decide the actual TB size through the mapping of the transport block size table.

Please note that the above embodiments are merely exemplary illustrations of the present invention, and those skilled in the arts can certainly make appropriate modifications according to practical demands. For example, the embodiment of the present invention can appropriately adjust other parameter values corresponding to lower resource usage in the combination table (such as each combination corresponding to QPSK modulation) according to the number of valid TFRI values, which also belongs to the scope of the present invention.

As mentioned above, the embodiment of the present invention configures a parameter value corresponding to a least resource usage in the combination table to be an index value corresponding to the smallest TB size in the transport block size table, for improving the problem of the prior art that smaller TB sizes cannot be used to perform data reception or transmission, so as to prevent the waste of radio resources.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of configuring a transport block size for a user equipment in a wireless communications system, the method comprising:
   providing a combination table for use when a high speed Medium Access Control (MAC-hs) entity is configured with an enhanced MAC-hs format (MAC-ehs) for generating a parameter value according to a combination of a modulation scheme and a number of channelization codes chosen by a base station to decide a transport block size index; and
   configuring a first parameter value corresponding to a least resource usage in the combination table to be a first transport block size index before deciding the transport block size index, wherein the first transport block size index is a transport block size index corresponding to a smallest transport block size in a transport block size table, and the combination table and the transport block size table are used when Quadrature Phase Shift Keying (QPSK) modulation, 16 Quadrature Amplitude Modulation (16QAM) or 64 Quadrature Amplitude Modulation (64QAM) is activated.

2. The method of claim 1, wherein the transport block size index is a sum of the parameter value and a transport format and resource indicator (TFRI) value.

3. The method of claim 1, wherein the first parameter value corresponds to a combination of QPSK modulation and one channelization code.

4. The method of claim 1, wherein the wireless communications system is a high speed downlink packet access (HSDPA) system with 64 quadrature amplitude modulation (64QAM) or higher order modulation capability.

5. A communications device of a wireless communications system utilized for configuring a transport block size, the communications device comprising:
   a control circuit for realizing functions of the communications device;
   a processor installed in the control circuit, for executing a program code to operate the control circuit; and
   a memory coupled to the processor for storing the program code;
   wherein program code executes instructions for:
   providing a combination table for use when a high speed Medium Access Control (MAC-hs) entity is configured with an enhanced MAC-hs format (MAC-ehs) for generating a parameter value according to a combination of a modulation scheme and a number of channelization codes chosen by a base station to decide a transport block size index; and
   configuring a first parameter value corresponding to a least resource usage in the combination table to be a first transport block size index before deciding the transport block size index, wherein the first transport block size index is a transport block size index corresponding to a smallest transport block size in a transport block size table, and the combination table and the transport block size table are used when Quadrature Phase Shift Keying (QPSK) modulation. 16 Quadrature Amplitude Modulation (16QAM) or 64 Quadrature Amplitude Modulation (64QAM) is activated.

6. The communications device of claim 5, wherein the transport block size index is a sum of the parameter value and a transport format and resource indicator (TFRI) value.

7. The communications device of claim 5, wherein the first parameter value corresponds to a combination of QPSK modulation and one channelization code.

8. The communications device of claim 5, wherein the wireless communications system is a high speed downlink packet access (HSDPA) system with 64 quadrature amplitude modulation (64QAM) or higher order modulation capability.

* * * * *